United States Patent
Schubert et al.

(10) Patent No.: US 11,577,366 B2
(45) Date of Patent: Feb. 14, 2023

(54) RECIRCULATION OF WET ABRASIVE MATERIAL IN ABRASIVE WATERJET SYSTEMS AND RELATED TECHNOLOGY

(71) Applicant: OMAX Corporation, Kent, WA (US)

(72) Inventors: Ernst H. Schubert, Snoqualmie Pass, WA (US); Axel H. Henning, Black Diamond, WA (US)

(73) Assignee: OMAX Corporation, Kent, WA (US)

( * ) Notice: Subject to any disclaimer, the term of this patent is extended or adjusted under 35 U.S.C. 154(b) by 1247 days.

(21) Appl. No.: 15/839,708

(22) Filed: Dec. 12, 2017

(65) Prior Publication Data

US 2018/0161958 A1 Jun. 14, 2018

Related U.S. Application Data

(60) Provisional application No. 62/433,167, filed on Dec. 12, 2016.

(51) Int. Cl.
  *B24C 7/00* (2006.01)
  *B26F 3/00* (2006.01)
  *B24C 1/04* (2006.01)

(52) U.S. Cl.
  CPC .............. *B24C 7/0023* (2013.01); *B24C 1/04* (2013.01); *B24C 1/045* (2013.01); *B24C 7/00* (2013.01); *B24C 7/003* (2013.01); *B26F 3/004* (2013.01)

(58) Field of Classification Search
  CPC ........... B24C 1/00; B24C 7/0023; B24C 1/04; B24C 1/045; B24C 7/00; B24C 7/003; B26F 3/004

(Continued)

(56) References Cited

U.S. PATENT DOCUMENTS

| 773,665 A | 11/1904 | Murray |
| 1,081,071 A | 12/1913 | Westland |

(Continued)

FOREIGN PATENT DOCUMENTS

| CN | 101357809 A | 2/2009 |
| CN | 101811287 A | 8/2010 |

(Continued)

OTHER PUBLICATIONS

Ruppenthal, Michael, "Carinox S.A. Purchases Third Waterjet Cutting Machine from Flow International Corporation" (http://www.businesswire.com/news/home/20031218005772/en/Carinox), Business Wire, Dec. 18, 2003, p. 1, Kent, WA.

(Continued)

*Primary Examiner* — Katina N. Henson
(74) *Attorney, Agent, or Firm* — Perkins Coie LLP

(57) ABSTRACT

An abrasive waterjet system in accordance with an embodiment of the present technology includes a cutting head, a catcher downstream from the cutting head, and a conveyance configured to carry slurry including abrasive material and liquid collected from the catcher toward the cutting head. The cutting head includes a jet-forming orifice and a mixing chamber downstream from the jet-forming orifice. The cutting head also includes a slurry inlet through which the mixing chamber receives slurry including abrasive material and liquid collected from the catcher. The abrasive waterjet system can be configured for substantially closed-loop recycling of wet abrasive material. This can be useful, for example, to increase abrasive material utilization efficiency and to decrease abrasive material disposal costs. These and/or other benefits may be realized both in the context of low pressure abrasive waterjet systems and in the context of high pressure abrasive waterjet systems.

22 Claims, 2 Drawing Sheets

(58) Field of Classification Search
USPC .................................................. 451/2, 87, 89
See application file for complete search history.

(56) References Cited

U.S. PATENT DOCUMENTS

| | | |
|---|---|---|
| 1,144,556 A | 6/1915 | Lowe |
| 1,684,431 A | 9/1928 | Behee, Jr. |
| 2,359,352 A | 10/1944 | Bucknam et al. |
| 2,929,120 A | 3/1960 | Brandt et al. |
| 2,985,050 A | 5/1961 | Schwacha |
| 3,014,665 A | 12/1961 | Shames et al. |
| 3,073,070 A * | 1/1963 | Mead ............... B24C 7/0053 451/2 |
| 3,137,978 A | 6/1964 | Incantalupo |
| 3,148,484 A | 9/1964 | Meek |
| 3,201,901 A | 8/1965 | Pauli |
| 3,270,464 A | 9/1966 | Bowling, Jr. et al. |
| 3,413,794 A | 12/1968 | Bell et al. |
| 3,452,412 A | 7/1969 | Allman, Jr. et al. |
| 3,507,740 A | 4/1970 | Gaspari |
| 3,543,444 A | 12/1970 | Mehta |
| 3,553,895 A * | 1/1971 | Power ............... B24C 9/003 451/87 |
| 3,593,459 A | 7/1971 | Kulischenko |
| 3,708,936 A | 1/1973 | Rogers |
| 3,769,753 A | 11/1973 | Fleischer |
| 3,834,082 A | 9/1974 | Grudzinski |
| 4,048,918 A | 9/1977 | Peck |
| 4,049,545 A | 9/1977 | Horvath |
| 4,058,986 A | 11/1977 | Granholm |
| 4,075,789 A | 2/1978 | Dremann |
| 4,109,636 A | 8/1978 | Burge |
| 4,125,969 A | 11/1978 | Easton |
| 4,164,183 A | 8/1979 | Peck |
| 4,216,906 A | 8/1980 | Olsen et al. |
| 4,253,610 A | 3/1981 | Larkin |
| 4,280,913 A | 7/1981 | Applegate et al. |
| 4,478,368 A | 10/1984 | Yie |
| 4,522,597 A | 6/1985 | Gallant |
| 4,534,427 A | 8/1985 | Wang et al. |
| 4,545,157 A | 10/1985 | Saurwein |
| 4,547,286 A | 10/1985 | Hsiung |
| 4,555,872 A | 12/1985 | Yie |
| 4,617,064 A | 10/1986 | Moore |
| 4,666,083 A | 5/1987 | Yie |
| 4,674,239 A | 6/1987 | Jodoin |
| 4,698,940 A | 10/1987 | Zwicker |
| 4,742,623 A | 5/1988 | Meurer et al. |
| 4,785,027 A | 11/1988 | Brasington et al. |
| 4,802,312 A | 2/1989 | Glaeser et al. |
| 4,802,993 A | 2/1989 | Katoh |
| 4,815,241 A | 3/1989 | Woodson |
| 4,816,284 A | 3/1989 | Magee |
| 4,817,342 A | 4/1989 | Martin et al. |
| 4,817,874 A | 4/1989 | Jarzebowicz |
| 4,820,913 A | 4/1989 | Haddock |
| 4,821,467 A | 4/1989 | Woodson et al. |
| 4,872,975 A | 10/1989 | Benson |
| 4,878,320 A | 11/1989 | Woodson |
| 4,934,111 A | 6/1990 | Hashish et al. |
| 4,951,429 A | 8/1990 | Hashish et al. |
| 4,955,164 A | 9/1990 | Hashish et al. |
| 4,984,397 A | 1/1991 | Van Leeuwen |
| 4,993,200 A | 2/1991 | Morioka et al. |
| 4,995,202 A | 2/1991 | Gardner et al. |
| 5,018,670 A | 5/1991 | Chalmers |
| 5,081,799 A | 1/1992 | Kirschner et al. |
| 5,098,229 A | 3/1992 | Meier et al. |
| 5,107,630 A | 4/1992 | Lodewijk |
| 5,109,636 A | 5/1992 | Lloyd et al. |
| 5,176,018 A | 1/1993 | Thompson |
| 5,192,532 A | 3/1993 | Guay et al. |
| 5,201,150 A | 4/1993 | Kuboyama et al. |
| 5,203,794 A | 4/1993 | Stratford et al. |
| 5,205,998 A | 4/1993 | Boone et al. |
| 5,230,185 A | 7/1993 | Kirschner et al. |
| 5,236,459 A | 8/1993 | Koch et al. |
| 5,239,788 A | 8/1993 | Woodson |
| 5,271,255 A | 12/1993 | Thompson |
| 5,320,289 A | 6/1994 | Hashish et al. |
| 5,330,167 A | 7/1994 | Plumb |
| 5,335,459 A | 8/1994 | Dale |
| 5,352,254 A | 10/1994 | Celikkaya |
| 5,363,556 A | 11/1994 | Banholzer et al. |
| 5,407,379 A | 4/1995 | Shank et al. |
| 5,413,270 A | 5/1995 | Lechervy et al. |
| 5,415,584 A | 5/1995 | Brooke et al. |
| 5,421,766 A | 6/1995 | Shank, Jr. |
| 5,441,441 A | 8/1995 | Cook et al. |
| 5,468,066 A | 11/1995 | Hammonds |
| 5,472,367 A | 12/1995 | Slocum et al. |
| 5,484,325 A | 1/1996 | Shank |
| 5,492,497 A | 2/1996 | Brooke et al. |
| 5,508,596 A | 4/1996 | Olsen |
| 5,509,849 A | 4/1996 | Spears, Jr. |
| 5,588,901 A | 12/1996 | Rubey, III et al. |
| 5,591,064 A | 1/1997 | Spears, Jr. |
| 5,592,841 A | 1/1997 | Champaigne |
| 5,616,067 A | 4/1997 | Goenka |
| 5,637,030 A | 6/1997 | Chopra et al. |
| 5,643,058 A | 7/1997 | Erichsen et al. |
| 5,647,989 A | 7/1997 | Hayashi et al. |
| 5,649,694 A | 7/1997 | Buck |
| 5,679,058 A | 10/1997 | Rhoades |
| 5,704,824 A | 1/1998 | Hashish et al. |
| 5,730,635 A | 3/1998 | De Haas et al. |
| 5,759,086 A | 6/1998 | Klingel |
| 5,771,873 A | 6/1998 | Potter et al. |
| 5,800,246 A | 9/1998 | Tomioka |
| 5,851,139 A | 12/1998 | Xu |
| 5,876,267 A | 3/1999 | Kanda |
| 5,892,345 A | 4/1999 | Olsen |
| 5,908,349 A | 6/1999 | Warehime |
| 5,928,493 A | 7/1999 | Morkovsky et al. |
| 5,947,800 A | 9/1999 | Fring |
| 5,979,663 A * | 11/1999 | Herrmann ............... B01D 43/00 209/138 |
| 6,001,265 A | 12/1999 | Toyama et al. |
| 6,077,152 A | 6/2000 | Warehime |
| 6,083,001 A | 7/2000 | Deardon et al. |
| 6,098,677 A | 8/2000 | Wegman et al. |
| 6,099,388 A | 8/2000 | Fritsch et al. |
| 6,120,351 A | 9/2000 | Zeng |
| 6,136,386 A | 10/2000 | Nakahigashi et al. |
| 6,155,245 A | 12/2000 | Zanzuri |
| 6,168,503 B1 | 1/2001 | Pao et al. |
| 6,200,203 B1 | 3/2001 | Xu et al. |
| 6,227,768 B1 | 5/2001 | Higuchi et al. |
| 6,248,369 B1 | 6/2001 | Nier et al. |
| 6,276,993 B1 | 8/2001 | Miller |
| 6,280,302 B1 | 8/2001 | Hashish et al. |
| 6,283,833 B1 | 9/2001 | Pao et al. |
| 6,299,510 B1 | 10/2001 | Massenburg |
| 6,328,638 B1 | 12/2001 | Hopkins et al. |
| 6,346,197 B1 | 2/2002 | Stephenson et al. |
| 6,361,416 B1 | 3/2002 | Hopkins et al. |
| 6,390,898 B1 | 5/2002 | Pieper |
| 6,425,804 B1 | 7/2002 | Pettit et al. |
| 6,533,640 B1 | 3/2003 | Nopwaskey et al. |
| 6,533,643 B1 | 3/2003 | Feng |
| 6,548,173 B2 | 4/2003 | Erdemir et al. |
| 6,607,670 B2 | 8/2003 | Baldwin et al. |
| 6,676,039 B2 | 1/2004 | Lindsey et al. |
| 6,746,593 B2 | 6/2004 | Herbst |
| 6,752,685 B2 | 6/2004 | Ulrich et al. |
| 6,804,459 B2 | 10/2004 | Raghavan et al. |
| 6,922,605 B1 | 7/2005 | Olsen |
| 6,932,285 B1 | 8/2005 | Zeng |
| 6,970,793 B2 | 11/2005 | Pearson et al. |
| 7,014,770 B2 | 3/2006 | Umezawa et al. |
| 7,035,708 B1 | 4/2006 | Olsen |
| 7,040,959 B1 | 5/2006 | Panuska et al. |
| 7,074,112 B2 | 7/2006 | Olsen |
| 7,090,054 B2 | 8/2006 | Iwamasa |

(56) References Cited

U.S. PATENT DOCUMENTS

| | | |
|---|---|---|
| 7,094,135 B2 | 8/2006 | Chisum et al. |
| 7,108,585 B1 | 9/2006 | Dorfman et al. |
| 7,138,063 B1 | 11/2006 | Teter et al. |
| 7,419,418 B2 | 9/2008 | Alberts et al. |
| 7,465,215 B2 | 12/2008 | Shimizu et al. |
| 7,485,027 B2 | 2/2009 | Miller |
| 7,549,911 B2 | 6/2009 | Nguyen |
| 7,585,201 B2 | 9/2009 | Kanai et al. |
| 7,758,742 B2 | 7/2010 | Powell |
| 7,815,490 B2 | 10/2010 | Liu |
| 7,959,790 B2 | 6/2011 | Woytowich et al. |
| 7,980,923 B2 | 7/2011 | Olmo et al. |
| 7,981,301 B2 | 7/2011 | Powell |
| 8,048,279 B2 | 11/2011 | Powell et al. |
| 8,123,591 B2 | 2/2012 | Olsen |
| 8,308,525 B2 | 11/2012 | Hashish et al. |
| 8,342,912 B2 | 1/2013 | Funatsu et al. |
| 8,593,086 B2 | 11/2013 | Hay et al. |
| 8,821,213 B2 | 9/2014 | Liu et al. |
| 8,892,236 B2 | 11/2014 | Olsen |
| 8,904,912 B2 | 12/2014 | Raghavan et al. |
| 8,920,213 B2 | 12/2014 | Liu |
| 9,003,955 B1 | 4/2015 | Stang et al. |
| 9,011,204 B2 | 4/2015 | Raghavan et al. |
| 9,044,873 B2 | 6/2015 | Guglielmetti et al. |
| 9,050,704 B1 | 6/2015 | Liu et al. |
| 9,067,331 B2 | 6/2015 | Stang |
| 9,090,808 B1 | 7/2015 | Liu et al. |
| 9,095,955 B2 | 8/2015 | Raghavan et al. |
| 9,108,297 B2 | 8/2015 | Schubert et al. |
| 9,138,863 B2 | 9/2015 | Schubert et al. |
| 9,273,682 B2 | 3/2016 | Stang |
| 9,283,656 B2 | 3/2016 | Schubert et al. |
| 9,492,908 B2 | 11/2016 | Schubert et al. |
| 9,586,306 B2 | 3/2017 | Zhang et al. |
| 9,610,674 B2 | 4/2017 | Raghavan et al. |
| 9,636,799 B2 | 5/2017 | Liu et al. |
| 9,638,357 B1 | 5/2017 | Raghavan et al. |
| 9,649,744 B2 | 5/2017 | Raghavan et al. |
| 9,658,613 B2 | 5/2017 | Henning et al. |
| 9,720,399 B2 | 8/2017 | Henning et al. |
| 9,727,051 B2 | 8/2017 | Henning et al. |
| 9,772,620 B2 | 9/2017 | Henning et al. |
| 9,810,205 B2 | 11/2017 | Raghavan et al. |
| 9,827,649 B2 | 11/2017 | Schubert et al. |
| 9,891,617 B2 | 2/2018 | Henning et al. |
| 9,976,675 B1 | 5/2018 | Raghavan et al. |
| 9,989,954 B2 | 6/2018 | Henning et al. |
| 10,010,999 B2 | 7/2018 | Raghavan et al. |
| 10,048,676 B2 | 8/2018 | Henning et al. |
| 10,146,209 B2 | 12/2018 | Henning et al. |
| 10,201,914 B2 | 2/2019 | Schlough et al. |
| 10,564,627 B2 | 2/2020 | Henning et al. |
| 10,606,240 B2 | 3/2020 | Henning et al. |
| 10,642,252 B2 | 5/2020 | Henning et al. |
| 10,656,622 B2 | 5/2020 | Henning et al. |
| 10,675,733 B2 | 6/2020 | Zhang et al. |
| 10,780,551 B2 | 9/2020 | Zhang et al. |
| 10,808,688 B1 | 10/2020 | Raghavan et al. |
| 10,859,997 B1 | 12/2020 | Miles et al. |
| 10,864,613 B2 | 12/2020 | Raghavan et al. |
| 10,981,259 B2 | 4/2021 | Lerea et al. |
| 10,983,503 B2 | 4/2021 | Henning et al. |
| 10,990,080 B2 | 4/2021 | Henning et al. |
| 11,125,360 B2 | 9/2021 | Raghavan et al. |
| D934,920 S | 11/2021 | Farnsworth et al. |
| 11,224,987 B1 | 1/2022 | Guglielmetti |
| 2001/0030245 A1 | 10/2001 | Lindsey et al. |
| 2001/0046833 A1 | 11/2001 | Hashish et al. |
| 2002/0028634 A1 | 3/2002 | Massenburg |
| 2003/0034122 A1 | 2/2003 | Asai |
| 2003/0044380 A1 | 3/2003 | Zhu et al. |
| 2003/0085295 A1 | 5/2003 | Dijkman et al. |
| 2003/0166378 A1 | 9/2003 | Fuksshimov et al. |
| 2003/0224704 A1 | 12/2003 | Shank |
| 2004/0107810 A1 | 6/2004 | Sciulli et al. |
| 2004/0132383 A1 | 7/2004 | Langford et al. |
| 2005/0017091 A1 | 1/2005 | Olsen et al. |
| 2005/0070205 A1 | 3/2005 | Korovin et al. |
| 2005/0239371 A1 | 10/2005 | Togawa |
| 2006/0219825 A1 | 10/2006 | Rohring et al. |
| 2006/0223423 A1 | 10/2006 | Dorfman et al. |
| 2007/0021039 A1 | 1/2007 | Haslett |
| 2007/0037495 A1 | 2/2007 | Matsubara et al. |
| 2007/0128988 A1 | 6/2007 | Rivir et al. |
| 2007/0131455 A1 | 6/2007 | Blange |
| 2007/0154561 A1 | 7/2007 | Takeda et al. |
| 2007/0155289 A1 | 7/2007 | Miller |
| 2007/0218808 A1 | 9/2007 | Shimizu et al. |
| 2008/0060493 A1 | 3/2008 | Liu |
| 2008/0110311 A1 | 5/2008 | Stangherlin |
| 2009/0042492 A1* | 2/2009 | Hashish .............. B24C 5/02 451/87 |
| 2009/0064832 A1 | 3/2009 | Caretta et al. |
| 2009/0214628 A1 | 8/2009 | de Rijk |
| 2009/0229793 A1 | 9/2009 | Treb et al. |
| 2009/0258582 A1 | 10/2009 | Miller |
| 2009/0318064 A1 | 12/2009 | Hashish |
| 2010/0003894 A1 | 1/2010 | Miller et al. |
| 2010/0124872 A1 | 5/2010 | Hashish et al. |
| 2010/0269593 A1 | 10/2010 | Moser et al. |
| 2011/0269382 A1 | 11/2011 | Deleris |
| 2012/0021676 A1* | 1/2012 | Schubert .............. B24C 5/02 451/38 |
| 2012/0085211 A1 | 4/2012 | Liu et al. |
| 2012/0145647 A1 | 6/2012 | Volkel et al. |
| 2012/0156969 A1 | 6/2012 | Liu |
| 2012/0160706 A1 | 6/2012 | Poirier et al. |
| 2012/0196516 A1 | 8/2012 | Funatsu et al. |
| 2012/0252325 A1 | 10/2012 | Schubert et al. |
| 2012/0252326 A1 | 10/2012 | Schubert et al. |
| 2012/0282845 A1 | 11/2012 | Whang et al. |
| 2013/0005225 A1 | 1/2013 | Russo |
| 2013/0025425 A1 | 1/2013 | Knaupp et al. |
| 2013/0105717 A1 | 5/2013 | Nguyen |
| 2013/0267152 A1 | 10/2013 | Tera et al. |
| 2014/0045409 A1 | 2/2014 | Zhang et al. |
| 2014/0087635 A1* | 3/2014 | Ogawa ............ B24C 11/005 451/40 |
| 2014/0273768 A1 | 9/2014 | Guglielmetti et al. |
| 2015/0336239 A1 | 11/2015 | Liu et al. |
| 2016/0325401 A1 | 11/2016 | Meyer |
| 2017/0190021 A1 | 7/2017 | Zhang et al. |
| 2017/0297168 A1 | 10/2017 | Raghavan et al. |
| 2018/0264625 A1 | 9/2018 | Schneidau et al. |
| 2018/0320802 A1 | 11/2018 | Raghavan et al. |
| 2018/0364679 A1 | 12/2018 | Henning et al. |
| 2019/0101894 A1 | 4/2019 | Henning et al. |
| 2019/0249805 A1 | 8/2019 | Olsen et al. |
| 2020/0007254 A1 | 1/2020 | Hay et al. |
| 2020/0406424 A1 | 12/2020 | Zhang et al. |
| 2021/0221534 A1 | 7/2021 | Henning et al. |

FOREIGN PATENT DOCUMENTS

| | | |
|---|---|---|
| CN | 201785277 U | 4/2011 |
| CN | 102139978 A | 8/2011 |
| CN | 202415300 U | 9/2012 |
| EP | 0165690 A2 | 12/1985 |
| EP | 0761603 A1 | 3/1997 |
| FR | 2452696 A1 | 10/1980 |
| GB | 2198975 A | 6/1988 |
| GB | 2483740 A | 3/2012 |
| JP | 2012157956 A | 8/2012 |
| WO | 02085572 A1 | 10/2002 |
| WO | 03011524 A1 | 2/2003 |
| WO | 03055644 A1 | 7/2003 |
| WO | 2009050251 A2 | 4/2009 |
| WO | 2010122336 A2 | 10/2010 |

(56) References Cited

FOREIGN PATENT DOCUMENTS

WO       2017134242 A1    8/2017
WO     20180197018 A1   11/2018

OTHER PUBLICATIONS

Operation Manual Abrasive Delivery System Type ADS-24-11, Straaltechniek International B.V., © Flow Europe GmbH, Jul. 2000, 28 pages, The Netherlands.
Bakalar, Tomas et al., "Heavy metal removal using reverse osmosis", Acta Montanistica Slovaca Rocnik 14 (2009), cislo 3, 250-253.
Hashish, M., "Waterjet Machine Tool of the Future", 9th American Waterjet Conference, Aug. 23-26, 1997, Paper 58, 15 pages.
Tsai, Feng-Che et al., "Abrasive jet polishing of micro groove using compound SiC abrasives with compound additives", Advanced Materials Research vols. 481-420 (2012), pp. 2153-2157, © 2012 Trans Tech Publications, Switzerland.
Fox Solids Conveyying Eductors, http://www.flowmeterdirectory.com/solid-conveying-eductor.html, accessed May 24, 2011, 2 pages.
Hashish, Porter Cable Pancake Compressor Instruction Manual, 2006, 66 pages.

\* cited by examiner

RECIRCULATION OF WET ABRASIVE MATERIAL IN ABRASIVE WATERJET SYSTEMS AND RELATED TECHNOLOGY

CROSS-REFERENCE TO RELATED APPLICATION

This application claims the benefit of U.S. Provisional Patent Application No. 62/433,167, filed Dec. 12, 2016, which application is incorporated by reference herein in its entirety. To the extent the foregoing application and/or any other materials incorporated herein by reference conflict with the present disclosure, the present disclosure controls.

TECHNICAL FIELD

The present technology is related to abrasive waterjet systems.

BACKGROUND

Abrasive waterjet systems are used in precision cutting, shaping, carving, reaming, and other material processing applications. During operation of an abrasive waterjet system, a cutting head directs a high-velocity jet of liquid carrying particles of abrasive material toward a workpiece to rapidly erode portions of the workpiece. Abrasive waterjet processing has significant advantages over other material processing technologies (e.g., grinding, plasma-cutting, etc.). For example, abrasive waterjet systems tend produce relatively fine and clean cuts without heat-affected zones around the cuts. Abrasive waterjet systems also tend to be highly versatile with respect to the material type of the workpiece. The range of materials that can be processed using abrasive waterjet systems includes very soft materials (e.g., rubber, foam, leather, and paper) as well as very hard materials (e.g., stone, ceramic, and hardened metal). Furthermore, in many cases, abrasive waterjet systems are capable of executing demanding material processing operations while generating little or no dust, smoke, or other potentially toxic airborne byproducts.

Conventionally, abrasive material is passed through a cutting head of an abrasive waterjet system only one time and then discarded. This practice is wasteful because some abrasive material is still usable after one pass through a cutting head. For example, some abrasive material incorporated into a jet may be carried by a portion of the jet that does not contact a workpiece being processed. Wasting abrasive material is especially problematic when the abrasive material is used to process workpieces containing hazardous material (e.g., lead, beryllium copper, etc.). In these cases, disposal costs may approach or exceed material costs. Accordingly, there is a need for innovation in the field of abrasive material utilization in abrasive waterjet processing, such as to reduce or eliminate waste of abrasive material and/or to reduce or eliminate unduly high disposal costs.

DETAILED DESCRIPTION

Figures 1A, 1B:
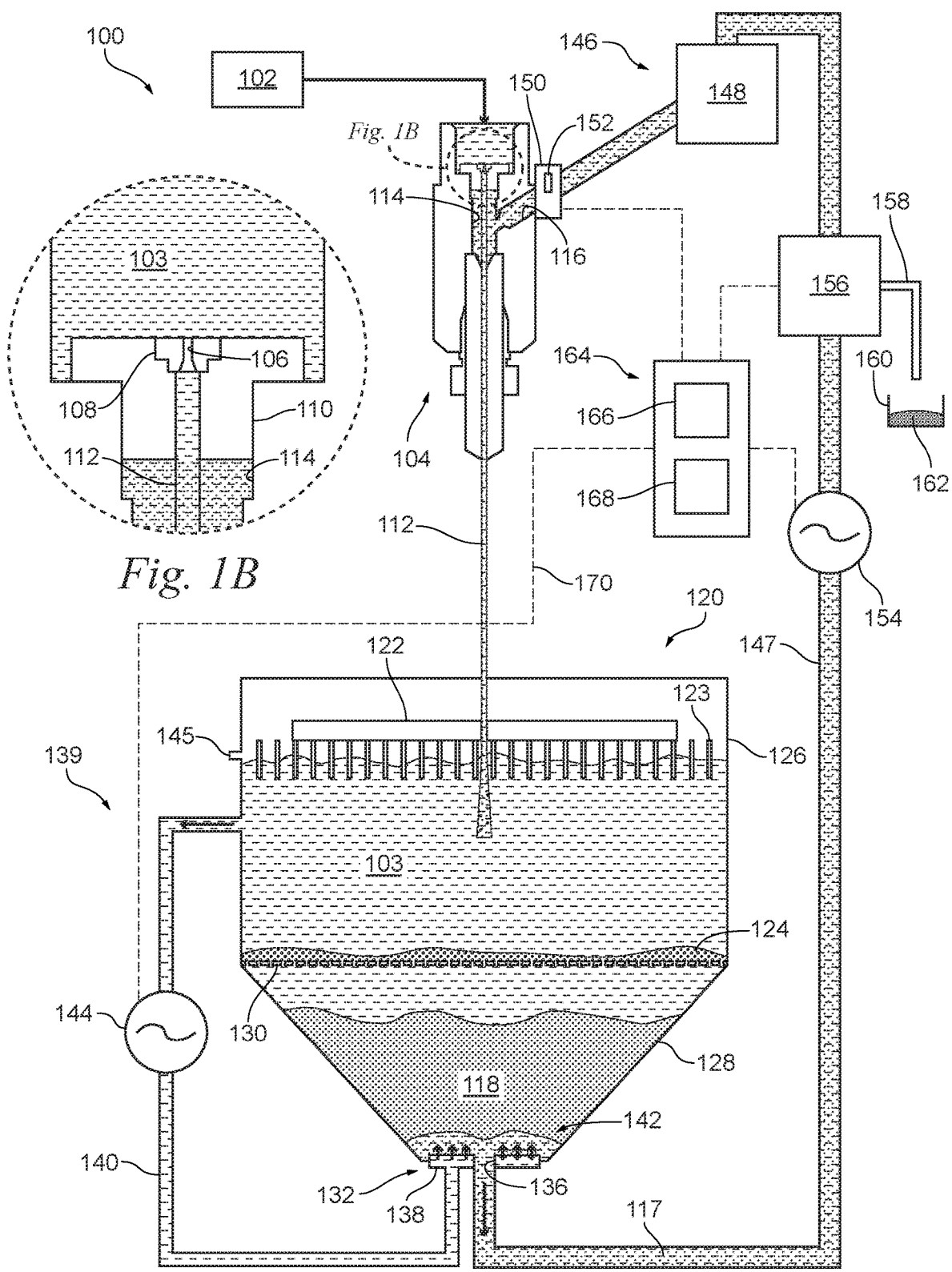
FIG. 1A is a cross-sectional side view of portions of an abrasive waterjet system in accordance with an embodiment of the present technology.
FIG. 1B is an enlarged view of a portion of FIG. 1A.

Consumers generally recognize that abrasive waterjet processing is superior to other material processing technologies with respect to performance and versatility, but many consumers perceive abrasive waterjet processing to be relatively high cost. Indeed, the capital cost of an abrasive waterjet system suitable for heavy industrial use is relatively high. This is partially due to the relationship between operating pressure and abrasive material consumption in the field of abrasive waterjet processing. By far the greatest contributor to the operating cost of an abrasive waterjet system is the cost of abrasive material. Conventionally, increasing the operating pressure of an abrasive waterjet system was known to increase the abrasive material utilization efficiency of the system. This is because higher pressures enable greater acceleration of abrasive material entrained in a jet. Accordingly, a given amount of abrasive material carried by a jet generated from higher pressure liquid does more work than the same amount of abrasive material carried by a jet generated from lower pressure liquid. Also, a jet generated from higher pressure liquid typically moves laterally through a process recipe at a faster rate than a less powerful jet generated from lower pressure liquid. This faster lateral movement leads to more of the jet diameter (and more of the entrained abrasive material) striking a workpiece rather than passing into a catcher unused.

For the foregoing and other reasons, abrasive waterjet systems that operate at ultrahigh pressures (e.g., pressures of 50,000 psi or greater) are favored for most heavy industrial applications even though these systems tend to be more capital intensive than abrasive waterjet systems that operate at lower pressures. This is not necessarily the case, however, for hobbyist and light industrial applications. In these applications, consumers are often willing to sacrifice high abrasive material utilization efficiency and other advantages of ultrahigh pressure abrasive waterjet systems in order to reduce capital costs. There is a need, therefore, to mitigate the disadvantages of relatively low pressure abrasive waterjet systems to better serve these consumers. At least some embodiments of the present technology address this need and/or offer other advantages over conventional technologies.

Abrasive waterjet systems in accordance with at least some embodiments of the present technology include features that increase abrasive material utilization efficiency by allowing for recirculation of wet abrasive material. For example, an abrasive waterjet system in accordance with a particular embodiment includes a cutting head, a catcher, and a conveyance that carries slurry including abrasive material and liquid from the catcher toward the cutting head for reuse. As the abrasive material is recirculated multiple times, the fraction of pulverized abrasive material in the slurry slowly increases, eventually causing the cutting power of a batch of abrasive material to be effectively exhausted. At this point, the abrasive material can be swapped for fresh abrasive material and the recirculation can resume until the new abrasive material becomes exhausted. This approach not only dramatically improves abrasive material utilization, it allows an abrasive waterjet system to be more compact because the catcher can act as an abrasive material hopper taking the place of a separate hopper configured to handle dry abrasive material. For example, fresh abrasive material can simply be poured into the catcher continuously or in batches. Other advantages over conventional counterparts in addition to or instead of the foregoing advantages also may be present. Furthermore, as described below, abrasive waterjet systems and related devices, systems, and methods in accordance with embodiments of the present technology can have features in addition to or instead of features associated with recirculation of wet abrasive material.

Figure 2:
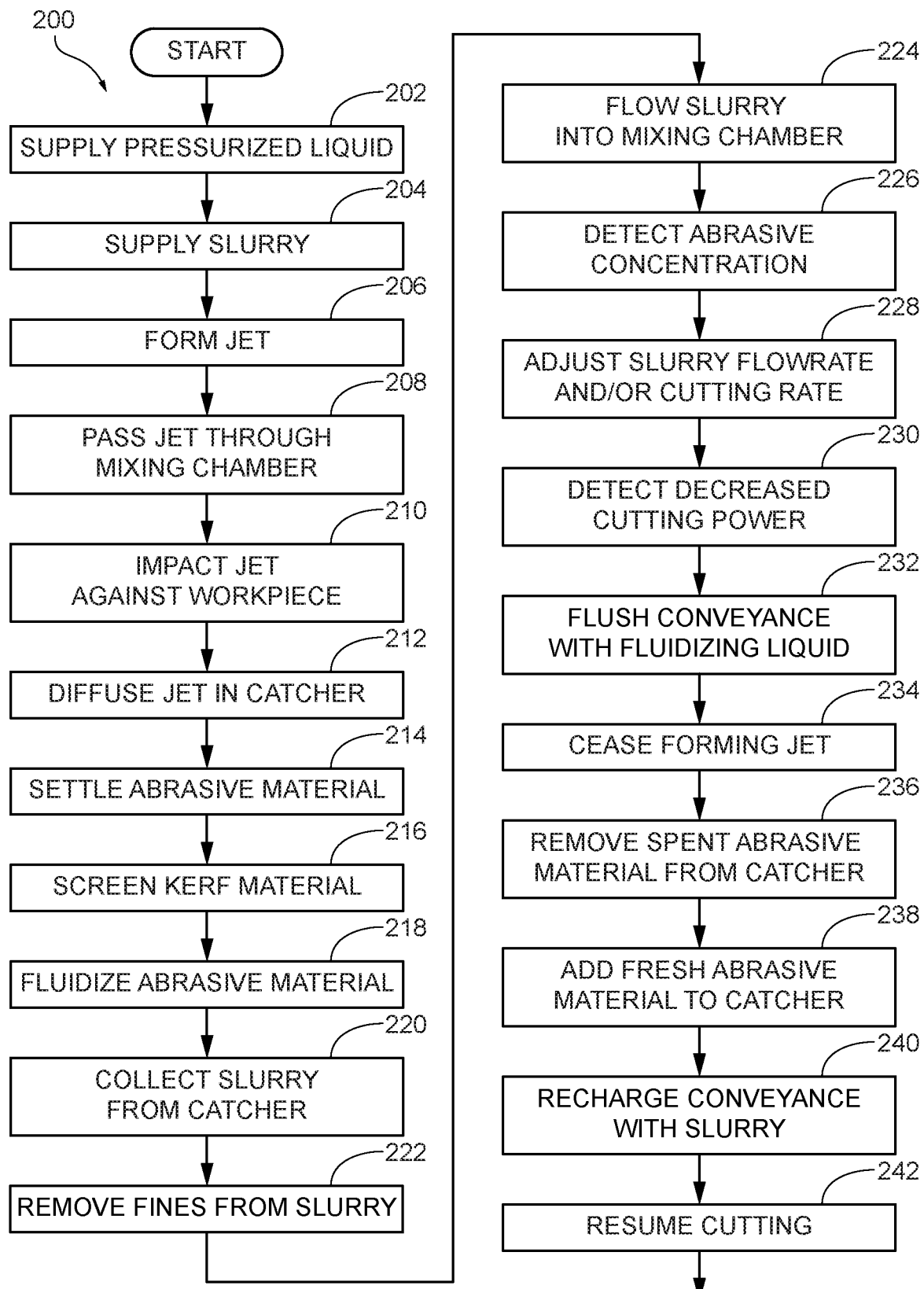
FIG. 2 is a flow chart illustrating a method for operating an abrasive waterjet system in accordance with an embodiment of the present technology.

Specific details of abrasive waterjet systems and related devices, systems, and methods in accordance with several embodiments of the present technology are disclosed herein with reference to FIGS. 1A-2. Although the systems, devices, and methods may be disclosed herein primarily or entirely with respect to hobbyist and light industrial abrasive waterjet applications, other applications in addition to those disclosed herein are within the scope of the present technology. Furthermore, it should understood, in general, that other systems, devices, and methods in addition to those disclosed herein are within the scope of the present technology. For example, systems, devices, and methods in accordance with embodiments of the present technology can have different and/or additional configurations, components, and procedures than those disclosed herein. Moreover, a person of ordinary skill in the art will understand that systems, devices, and methods in accordance with embodiments of the present technology can be without one or more of the configurations, components, and/or procedures disclosed herein without deviating from the present technology. Abrasive waterjet systems in accordance with embodiments of the present technology can be used with a variety of suitable fluids, such as water, aqueous solutions, hydrocarbons, glycols, and nitrogen. As such, although the term "waterjet" is used herein for ease of reference, unless the context clearly indicates otherwise, the term refers to a jet formed by any suitable fluid, and is not limited exclusively to water or aqueous solutions.

FIG. 1A is a cross-sectional side view of portions of a waterjet system 100 in accordance with an embodiment of the present technology. FIG. 1B is an enlarged view of a portion of FIG. 1A. With reference to FIGS. 1A and 1B together, the waterjet system 100 can include a pump 102 (shown schematically) configured to pressurize liquid 103 to a suitable pressure for a material processing application. In some cases, the pump 102 operates at relatively low pressure. For example, the pump 102 can have a maximum operating pressure of at most 15,000 psi, which is below the maximum operating pressure of most abrasive waterjet systems used in heavy industry. In other cases, the pump 102 can have a higher maximum operating pressure (e.g., within a range from 15,000 psi to 120,000 psi or greater). It should be noted, in general, that wet abrasive material recycling in accordance with embodiments of the present technology is potentially useful both in the context of abrasive waterjet systems that operate at relatively low pressure and in the context of abrasive waterjet systems that operate at relatively high pressure. For example, when a high-pressure abrasive waterjet system is used to process workpieces containing hazardous material, abrasive material utilization efficiency may be high, but high disposal costs may still warrant use of wet abrasive material recycling. Moreover, even when abrasive material utilization efficiency is high and disposal costs are low, wet abrasive material recycling may be beneficial to reduce the overall environmental impact of a process, to reduce abrasive material storage and handling requirements, and/or for other reasons.

With reference again to FIGS. 1A and 1B, the waterjet system 100 can include a cutting head 104 downstream from the pump 102. The cutting head 104 can include a jet-forming orifice 106 that receives pressurized liquid 103 from the pump 102. The pump 102 can provide all or most of a total supply of liquid 103 to the jet-forming orifice 106. The jet-forming orifice 106 can be defined by a jewel 108 held within a mount 110 disposed within the cutting head 104. During operation of the waterjet system 100, pressurized liquid 103 flowing through the jet-forming orifice 106 forms a jet 112. Downstream from the jet-forming orifice 106, the cutting head 104 can include a mixing chamber 114. The cutting head 104 can also include a slurry inlet 116 through which the mixing chamber 114 receives slurry 117 including abrasive material 118 and liquid 103. After exiting the mount 110, the jet 112 passes through the mixing chamber 114. Within the mixing chamber 114, the jet 112 contacts slurry 117, thereby causing abrasive material 118 to become entrained in the jet 112.

As shown in FIG. 1A, the waterjet system 100 can further include a catcher 120 downstream from the cutting head 104. The catcher 120 can contain a pool of liquid 103 that receives and disperses the jet 112. After exiting the cutting head 104, and before reaching the pool of liquid 103, the jet 112 can contact a workpiece 122 supported by slats 123 near an uppermost portion of the pool of liquid 103. After passing through the workpiece 122, the jet 112 can carry kerf material 124 liberated from the workpiece 122, spent (e.g., pulverized) abrasive material 118, and unspent abrasive material 118 into the pool of liquid 103. The catcher 120 can include an upper portion 126, a lower portion 128, and a screen 130 therebetween. Kerf material 124, spent abrasive material 118, and unspent abrasive material 118 from the jet 112 can settle by gravity from the upper portion 126 of the catcher 120 toward the lower portion 128 of the catcher 120.

The screen 130 can be configured to restrict settling of large particles of kerf material 124 such that the large particles of kerf material 124 collect at the upper surface of the screen 130. The screen 130 can be configured to lift out of the catcher 120 to facilitate occasional removal of the collected kerf material 124 from the catcher 120. Screening and removing the large particles of kerf material 124 can reduce or eliminate the possibility of such particles recirculated into the cutting head 104 and thereby causing a clog or otherwise interfering with the coherency of the jet 112. In at least some cases, energy from the jet 112 causes turbulence within the pool of liquid 103 below the workpiece 122, which facilitates movement of abrasive material 118 and small particles of kerf material 124 toward the lower portion 128 of the catcher 120 via the screen 130. In addition or alternatively, the catcher 120 can include one or more other components (e.g., a stirrer, a scraper, a recirculating pump, etc.; not shown) that promote this and/or other desirable movement of abrasive material 118 and small particles of kerf material 124 within the catcher 120.

Below the screen 130, the lower portion 128 of the catcher 120 can have a transverse cross-sectional area that decreases at successively lower elevations. For example, the lower portion 128 of the catcher 120 can be conical (as illustrated), slanted, trough shaped, etc. The shape of the lower portion 128 of the catcher 120 can be one that encourages abrasive material 118 within the catcher 120 to collect at a lowermost portion of the catcher 120. The waterjet system 100 can include a fluidizer 132 coupled to the lower portion 128 of the catcher 120 where the abrasive material 118 collects. In at least some cases, the fluidizer 132 includes a slurry port 136 and a manifold 138 extending at least partially around a perimeter of the slurry port 136. The waterjet system 100 can also include a conveyance 139 including a conduit 140 extending between the upper portion 126 of the catcher 120 and the manifold 138. The fluidizer 132 can be configured to inject liquid 103 from the conveyance 139 into collected abrasive material 118 within the catcher 120 via the manifold 138, thereby fluidizing abrasive material 118 at a region 142 above the manifold 138. The conveyance 139 can also include a pump 144 disposed along the conduit 140. The pump 144 can be configured to drive recirculation of liquid 103 through the conduit 140, the manifold 138, the lower portion 128 of the catcher 120, and the upper portion 126 of the catcher 120 in series. Excess liquid 103 and floating fines can flow out of the catcher 120 to a drain (not shown) via an overflow port 145 at the upper portion 126 of the catcher 120.

Fluidized abrasive material 118 at the region 142 above the manifold 138 can form slurry 117. The waterjet system 100 can include a conveyance 146 including a conduit 147 extending between the fluidizer 132 and the cutting head 104 configured to receive the resulting slurry 117 from the catcher 120 via the slurry port 136. In the illustrated embodiment, the conveyance 146 includes a holding tank 148 (shown schematically) disposed along the conduit 147, and the conveyance 146 is configured to carry the received slurry 117 toward the holding tank 148. The holding tank 148 can be useful to stage slurry 117 near the cutting head 104 and/or to attenuate fluctuations in demand for slurry 117 from the cutting head 104 relative to a supply of slurry 117 from the catcher 120. Slurry 117 from the holding tank 148 (or directly from the conduit 147) can flow into the mixing chamber 114 via the slurry inlet 116. In other embodiments, the holding tank 148 can be absent and the conduit 147 can be configured to deliver slurry 117 to the cutting head 104 directly. When present, the holding tank 148 can have a component (e.g., a stirrer, a recirculating pump, etc.; not shown) configured to agitate staged slurry 117 such that the staged slurry 117 is maintained in a flowable state.

In at least some cases, the waterjet system 100 includes a metering device 150 (e.g., a valve or orifice; shown schematically) configured to regulate the flow of slurry 117 into the mixing chamber 114. Furthermore, the waterjet system 100 can include a detector 152 (also shown schematically) coupled to the metering device 150 (as illustrated) or separate from the metering device 150. The detector 152 can be configured to detect a concentration of abrasive material 118 in slurry 117 flowing toward the mixing chamber 114, such as by use of a turbidity sensor and/or a mass-flow sensor. In addition or alternatively, the detector 152 can be configured to detect a flowrate of slurry 117 flowing toward the mixing chamber 114, such as by use of a rotameter and/or an ultrasonic sensor. As shown in FIG. 1A, the conveyance 146 can include a pump 154 disposed along the conduit 147. The pump 154 can be configured to drive movement of slurry 117 from the catcher 120 toward the holding tank 148. The cutting head 104 can be configured to draw slurry 117 from the holding tank 148 or from another portion of the conveyance 146 toward the mixing chamber 114 at least partially by the Venturi effect. As mentioned above, slurry 117 within the mixing chamber 114 can be entrained in the jet 112 and can be carried by the jet 112 back into the catcher 120, thereby completing a pass through a recycling loop.

As the abrasive material 118 is recycled, the proportion of both kerf fines and fragmented abrasive fines in the slurry 117 may increase. A relatively high concentration of fines in the slurry 117 may interfere with the flowability of the slurry 117. Accordingly, it may be useful to remove fines from the slurry 117 during operation of the waterjet system 100. As shown in FIG. 1A, the waterjet system 100 can include a fines separator 156 (shown schematically) operably associated with the conveyance 146. The fines separator 156, for example, can be located along the conduit 147 between the pump 154 and the holding tank 148. The waterjet system 100 can further include a conduit 158 configured to carry fines from the fines separator 156 toward a waste receptacle 160. The fines separator 156 can include a hydrocyclone, a screen, or another suitable mechanism configured to separate fines from a remainder of the slurry 117. Within the waste receptacle 160, the fines can accumulate in a pile 162 for eventual disposal. Separation of fines from the slurry 117 at the fines separator 156 can occur batchwise or continuously. In some embodiments, the fines separator 156 and the holding tank 148 are combined rather than separate. In still other embodiments, the fines separator 156 can be eliminated. For example, when the abrasive material 118 is changed frequently, removing fines may be unnecessary to maintain suitable flowability of the slurry 117.

With reference again to FIGS. 1A and 1B, the waterjet system 100 can be configured for substantially closed-loop recycling of abrasive material 118. For example, between batchwise change outs of abrasive material 118 within the waterjet system 100, at least 90% of all abrasive material 118 within the waterjet system 100 can recirculate continuously through a recycling loop including the catcher 120, the fluidizer 132, the conveyance 146, the cutting head 104, and the jet 112. During this recirculation, the fraction of spent abrasive material 118 within the waterjet system 100 can increase gradually as more and more unspent abrasive material 118 contacts the workpiece 122. Spent abrasive material 118 and small particles of kerf material 124 that pass through the screen 130 can be carried with remaining unspent abrasive material 118 in the slurry 117 flowing through the recycling loop. Even when the smallest fraction of the spent abrasive material 118 and liberated kerf material 124 is removed at the fines separator 156, the concentration of these material within the slurry 117 may steadily increase. Eventually, as the total solids content of the slurry 117 flowing through the recycling loop becomes dominated by spent abrasive material 118 and small particles of kerf material 124, the cutting power of the jet 112 may diminish to an unacceptably low level. At this point, a batchwise changing of abrasive material 118 within the waterjet system 100 can be performed to restore the cutting power of the jet 112 to an acceptable level. Alternatively or in addition, recirculating abrasive material 118 can be removed and/or fresh abrasive material 118 can be added continuously or semi-continuously.

When the jet 112 is inactive (e.g., during repositioning of the cutting head 104, during shutdown periods, and during workpiece placement) and at other times, it may be useful to at least partially clear the conveyance 146, the metering device 150, the fines separator 156, and the cutting head 104 of abrasive material 118. For example, when slurry 117 within these components is stagnant, it may tend to dewater and harden. The residual abrasive material 118 may then become non-flowable, leading to flow-passage restriction, clogging, or other problems when flow of slurry 117 resumes. In at least some cases, the waterjet system 100 is configured to at least partially clear components of the waterjet system 100 that carry the slurry 117 of the abrasive material 118 by increasing the flowrate of liquid 103 through the fluidizer 132. When the flowrate of liquid 103 through the fluidizer 132 is relatively low, the liquid 103 may form the slurry 117 with a suitable concentration of abrasive material 118 for flowability through the conveyance 146 and for enhancing the cutting power of the jet 112. Increasing the flowrate of liquid 103 through the fluidizer 132 may lower the concentration of abrasive material 118 within the slurry 117.

At a certain point, increasing the flowrate of liquid 103 through the fluidizer 132 may cause the liquid 103 to be drawn through the slurry port 136 with little or no abrasive material 118 from the lower portion 128 of the catcher 120. In this state, the liquid 103 may at least partially replace the slurry 117 within components of the waterjet system 100 downstream from the fluidizer 132, thus at least partially clearing these components of abrasive material 118. Operation of the jet 112 may continue during this process. Thereafter, the jet 112 and the fluidizer 132 may be turned off, and the conveyance 146 may continue to hold a static volume of the liquid 103. Due to the relatively low concentration of abrasive material 118 within the liquid 103, the components of the waterjet system 100 holding the liquid 103 may remain partially or entirely free of non-flowable abrasive material 118 until flow of slurry 117 through the conveyance 146 resumes. Accordingly, the fluidizer 132 can be useful not only to control the flowability of abrasive material 118, but also to reduce or eliminate undesirable accumulation of abrasive material 118 when the jet 112 is inactive.

The waterjet system 100 can further include a controller 164 including a processor 166 and memory 168. The controller 164 can be programmed with instructions (e.g., non-transitory instructions contained on the memory 168 and/or on a separate computer-readable medium) that, when executed, control operation of the waterjet system 100. The controller 164 can be operably connected to the pumps 144, 154, the metering device 150, and the fines separator 156 via communication links 170. The communication links 170 can be separate or combined, and can have any suitable form. For example, the communication links 170 can include any suitable wired and/or wireless communication components, such as wires and transceivers (e.g., antennas, Wi-Fi access points, Bluetooth transceivers, nearfield communication devices, wireless modems, etc.). In some cases, the controller 164 is local. In other cases, the controller 164 is remote. Furthermore, communication between the controller 164 and other components of the waterjet system 100 can be direct or indirect (e.g., via the Internet and/or via an intermediate computing system).

FIG. 2 is a flow chart illustrating a method 200 for operating the waterjet system 100 in accordance with an embodiment of the present technology. With reference to FIGS. 1A-2 together, suitable operations of the method 200 can be effected via the controller 164. The method 200 can include supplying pressurized liquid 103 to the jet-forming orifice 106 (block 202), and supplying slurry 117 to the mixing chamber 114 (block 204). Supplying pressurized liquid 103 can include supplying all or most of a total supply of pressurized liquid 103 to the jet-forming orifice 106 at a relatively low pressure (e.g., a pressure of at most 15,000 psi). Alternatively, the pressurized liquid 103 can be supplied at a higher pressure (e.g., within a range from 15,000 psi to 120,000 psi or greater). The method 200 can further include forming the jet 112 from the supplied pressurized liquid 103 at the jet-forming orifice 106 (block 206), and passing the jet 112 through the mixing chamber 114 while the mixing chamber 114 contains slurry 117 (block 208). This can cause abrasive material 118 from slurry 117 within the mixing chamber 114 to become entrained in the jet 112. The jet 112 carrying entrained abrasive material 118 can then be impacted against the workpiece 122 to alter (e.g., cut) the workpiece 122 (block 210). After passing through the workpiece 122, the jet 112 can be diffused in the catcher 120 (block 212). Abrasive material 118 carried by the jet 112 can then settle within the lower portion 128 of the catcher 120 by gravity (block 214). In conjunction with this settling, the method 200 can include screening large particles of kerf material 124 from abrasive material 118 within the catcher 120 (block 216).

At a high level, the method 200 can include recycling abrasive material 118 through a substantially closed-loop circuit including the mixing chamber 114, the catcher 120, and the conveyance 146. For example, the method 200 can include flowing at least 90% by weight of abrasive material 118 in a batch of fresh abrasive material 118 through this loop at least twice. Accumulated (e.g., settled) abrasive material 118 within the catcher 120 can be converted into slurry 117 to facilitate flowability. For example, the method 200 can include flowing liquid 103 or other fluidizing liquid from the upper portion 126 of the catcher 120 to the lower portion 128 of the catcher 120 via the manifold 138 to fluidize accumulated abrasive material 118 within the catcher 120 and thereby convert the accumulated abrasive material 118 into slurry 117 (block 218). The method 200 can further include collecting slurry 117 from the catcher 120 via the slurry port 136 (block 220) and removing fines from collected slurry 117 at the fines separator 156, such as by operation of a hydrocyclone (block 222). Next, the method 200 can include flowing (e.g., by pumping and/or by the Venturi effect) collected slurry 117 into the mixing chamber 114 via the conveyance 146, the fines separator 156, the metering device 150, and the slurry inlet 116 (block 224).

The method 200 can also include detecting a concentration of abrasive material 118 in collected slurry 117 (block 226), and automatically adjusting a flowrate of slurry 117 flowing into the mixing chamber 114 at least partially in response the detected concentration (block 228). This can be useful, for example, to reduce variation in a flowrate of abrasive material 118 into the mixing chamber 114, and corresponding variation in a cutting power of the jet 112. Furthermore, as discussed above, the cutting power of the jet 112 can decrease steadily as the fraction of spent abrasive material 118 and kerf material 124 in slurry 117 recirculating through the waterjet system 100 increases. In at least some cases, the method 200 includes automatically detecting a decreased cutting power of the jet 112 (block 230). The method 200 can also include automatically decreasing a rate of movement of the cutting head 104 through a predetermined sequence of movements (e.g., a process recipe) at least partially in response to the detected and/or an expected decreased cutting power of the jet 112. Similarly, the method 200 can include automatically adjusting a rate of movement of the cutting head 104 through a predetermined sequence of movements at least partially in response a detected and/or an expected concentration of abrasive material 118 in slurry 117 recirculating through the waterjet system 100. These adjustments can be useful, for example, to mitigate any adverse effect of changes in the quality or quantity of abrasive material 118 over time on the performance (e.g., accuracy, efficiency, etc.) of software that controls movement of the cutting head 104.

The method 200 can include increasing a flowrate of fluidizing liquid flowing toward abrasive material 118 at the fluidizer 132 to flush the conveyance 146 with fluidizing liquid (block 232). This can be useful, for example, to reduce or eliminate abrasive material 118 from the conveyance 146 in preparation for discontinuing flow through the conveyance 146. When the conveyance 146 is filled with fluidizing liquid, or at another suitable time, the method 200 can include ceasing forming the jet 112 (block 234). In some cases, this occurs when the cutting power of the jet 112 becomes or is expected to be unacceptably low. For example, this can be after a predetermined time following a batchwise changing of abrasive material 118 within the waterjet system 100 and/or at least partially in response to a detected and/or expected decrease in the cutting power of the jet 112. In other cases, ceasing forming the jet 112 may be associated with maintenance or loading of the waterjet system 100, or other circumstances.

While the jet 112 is ceased, spent abrasive material 118 can be removed from the catcher 120 (block 236) and fresh abrasive material 118 can be added to the catcher 120 (block 238). Next, the method 200 can include recharging the conveyance 146 with slurry 117 including fluidized abrasive material 118 from the catcher 120 (block 240) in preparation for resuming a cutting operation. In some cases, the fluidizer 132 is shut off after the conveyance 146 is flushed with fluidizing liquid. In these cases, recharging the conveyance 146 can include restarting the fluidizer 132 and resuming forming the jet 112. The cutting head 104 can then draw slurry 117 into the conveyance 146 such that the slurry 117 replaces the fluidizing liquid held in the conveyance 146 while the jet 112 was inactive. In other cases, the fluidizer 132 remain in operation while the jet 112 was inactive. With reference again to FIGS. 1 and 2, the method 200 can include resuming a cutting operation (block 242) after the conveyance 146 is recharged with slurry 117. When a process recipe is resumed, a rate at which the cutting head 104 moves according to the process recipe can be greater than it was when the process recipe was paused to account for an increase in the cutting power of the jet 112 due to the presence of fresh abrasive material 118. Alternatively or in addition, recirculating abrasive material 118 can be removed and/or fresh abrasive material 118 can be added continuously or semi-continuously. Furthermore, flushing the conveyance 146 with fluidizing liquid and then recharging the conveyance 146 with slurry 117 can occur in conjunction with an interruption in operation of the jet 112 not associated with changing or supplementing the abrasive material 118.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments may also exhibit such advantages, and not all embodiments need necessarily exhibit such advantages or other advantages disclosed herein to fall within the scope of the present technology.

Certain aspects of the present technology may take the form of computer-executable instructions, including routines executed by the controller 164. In some embodiments, the controller 164 is specifically programmed, configured, or constructed to perform one or more of these computer-executable instructions. Furthermore, some aspects of the present technology may take the form of data (e.g., non-transitory data) stored on the memory 168 or stored or distributed on other computer-readable media, including magnetic or optically readable or removable computer discs as well as media distributed electronically over networks. Accordingly, data structures and transmissions of data particular to aspects of the present technology are encompassed within the scope of the present technology. The present technology also encompasses methods of both programming computer-readable media to perform particular steps and executing the steps.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like may be used herein to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not all referring to the same embodiment. Furthermore, various particular features, structures, operations, or characteristics may be combined in any suitable manner in one or more embodiments of the present technology.

We claim:

1. An abrasive waterjet system, comprising:
   a cutting head including a jet-forming orifice and a mixing chamber downstream from the jet-forming orifice;
   a catcher downstream from the cutting head;
   a fluidizer operably associated with the catcher and configured to inject liquid into collected abrasive material within the catcher to fluidize the collected abrasive material to form slurry; and
   a conveyance configured to carry slurry including abrasive material and liquid collected from the catcher toward the cutting head, wherein the conveyance is configured to receive slurry including abrasive material and liquid from the catcher via the fluidizer, wherein the cutting head includes a slurry inlet, and wherein the mixing chamber is configured to receive slurry including abrasive material and liquid collected from the catcher via the conveyance and via the slurry inlet.

2. The abrasive waterjet system of claim 1 wherein the abrasive waterjet system is configured for substantially closed-loop recycling of abrasive material.

3. The abrasive waterjet system of claim 1 wherein the cutting head is configured to draw slurry including abrasive material and liquid into the mixing chamber at least partially by the Venturi effect.

4. The abrasive waterjet system of claim 1, further comprising a pump upstream from the cutting head, wherein the pump is configured to provide all or most of a total supply of liquid to the jet-forming orifice, and wherein the pump has a maximum operating pressure of at most 15,000 psi.

5. The abrasive waterjet system of claim 1 wherein the conveyance includes a screen configured to restrict movement of large particles of kerf material toward the mixing chamber.

6. The abrasive waterjet system of claim 1 wherein the conveyance includes a holding tank downstream from the catcher and upstream from the slurry inlet, and wherein the holding tank is configured to hold and to agitate slurry including abrasive material and liquid.

7. The abrasive waterjet system of claim 1, further comprising a fines separator configured to remove fines from the slurry before the mixing chamber receives the slurry.

8. The abrasive waterjet system of claim 1 wherein the fines separator includes a hydrocyclone.

9. The abrasive waterjet system of claim 1 wherein the catcher includes a screen positioned below the cutting head and configured to collect large particles of kerf material while allowing abrasive material to pass through toward the fluidizer.

10. The abrasive waterjet system of claim 1 wherein:
the fluidizer includes a slurry port and a manifold extending at least partially around a perimeter of the slurry port; and
the conveyance is configured to receive slurry including abrasive material and liquid from the fluidizer via the slurry port.

11. The abrasive waterjet system of claim 1, further comprising a controller including one or more processors and memory carrying instructions that, when executed by the one or more processors, cause:
the fluidizer to increase a flowrate of fluidizing liquid into the catcher and thereby reduce a concentration of abrasive material within the conveyance while the cutting head forms a jet from pressurized liquid at the jet-forming orifice; and
the cutting head to discontinue forming the jet while the concentration of abrasive material within the conveyance is reduced.

12. The abrasive waterjet system of claim 1 wherein:
the catcher includes an upper portion and a lower portion;
a transverse cross-sectional area of the lower portion of the catcher decreases at successively lower elevations; and
the fluidizer is coupled to the lower portion of the catcher.

13. The abrasive waterjet system of claim 12 wherein the fluidizer is coupled to a lowermost portion of the catcher.

14. The abrasive waterjet system of claim 12 wherein the lower portion of the catcher is conical.

15. The abrasive waterjet system of claim 12 wherein the lower portion of the catcher is trough shaped.

16. The abrasive waterjet system of claim 12 wherein the lower portion of the catcher is slanted.

17. The abrasive waterjet system of claim 12 wherein the conveyance is a first conveyance, and wherein the system further comprises a second conveyance configured to carry liquid from the upper portion of the catcher toward the fluidizer.

18. The abrasive waterjet system of claim 17 wherein:
the fluidizer includes a slurry port and a manifold extending at least partially around a perimeter of the slurry port;
the fluidizer is configured to receive liquid from the second conveyance via the manifold; and the first conveyance is configured to receive slurry including abrasive material and liquid from the fluidizer via the slurry port.

19. An abrasive waterjet system, comprising:
a cutting head configured to emit a jet of pressurized liquid and entrained abrasive material to cut through a workpiece;
a catcher downstream from the cutting head;
a fluidizer coupled to the catcher and configured to inject liquid into a lower portion of the catcher to fluidize abrasive material in the lower portion of the catcher to form a slurry of liquid and abrasive material; and
a conveyance configured to carry the slurry from the catcher toward the cutting head, wherein the cutting head includes a slurry inlet, and wherein the mixing chamber is configured to receive slurry including abrasive material and liquid collected from the catcher via the conveyance and via the slurry inlet.

20. The abrasive waterjet system of claim 19 wherein:
the fluidizer includes a slurry port and a manifold surrounding the slurry port;
the conveyance is in fluid communication with the manifold; and
the fluidizer injects the liquid into the lower portion of the catcher via the manifold.

21. The abrasive waterjet system of claim 19, further comprising a conduit in fluid communication with the fluidizer, wherein the conduit carries liquid from a portion of the catcher above the fluidizer to the fluidizer.

22. The abrasive waterjet system of claim 19, further comprising a holding tank downstream of the fluidizer and upstream of the cutting head, the holding tank configured to agitate slurry from the fluidizer to maintain the slurry in a flowable state.

* * * * *